United States Patent
Katou

(10) Patent No.: US 7,617,033 B2
(45) Date of Patent: Nov. 10, 2009

(54) STEERING SYSTEM AND METHOD FOR AUTOMOTIVE VEHICLE

(75) Inventor: Yuusuke Katou, Kawasaki (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 512 days.

(21) Appl. No.: 11/212,926

(22) Filed: Aug. 29, 2005

(65) Prior Publication Data

US 2006/0047391 A1    Mar. 2, 2006

(30) Foreign Application Priority Data

Aug. 30, 2004    (JP)    ............... 2004-250983

(51) Int. Cl.
*A01B 69/00*    (2006.01)
*B62D 5/04*    (2006.01)

(52) U.S. Cl. .......................... 701/41; 180/443

(58) Field of Classification Search ............ 701/41, 701/42; 180/402
See application file for complete search history.

(56) References Cited

U.S. PATENT DOCUMENTS 4,753,308 A * 6/1988 Noto et al. ............ 180/446
5,908,457 A * 6/1999 Higashira et al. ............ 701/41

FOREIGN PATENT DOCUMENTS

| DE | 696 14 642 T2 | 7/2002 |
| EP | 1 097 855 B1 | 12/2002 |
| JP | 2000-72006 A | 3/2000 |
| JP | 2001-191937 A | 7/2001 |

\* cited by examiner

*Primary Examiner*—Tuan C To
*Assistant Examiner*—Redhwan Mawari
(74) *Attorney, Agent, or Firm*—Foley & Lardner LLP

(57) ABSTRACT

In steering system and method for an automotive vehicle, a reaction force actuator is configured to provide a steering reaction force for the operation inputting section on the basis of a reaction force command value which accords with a state of steerable wheels, a steering actuator is configured to drive the steering mechanism on the basis of a turning angle command value which accords with a steering angle of the operation inputting section, a turning angle correction value setting section sets a turning angle correction value on the basis of the reaction force command value, and a turning angle command value correcting section subtracts the turning angle correction value from the turning angle command value, the turning angle correction value being set in such a manner that, as the reaction force command value becomes larger, the turning angle correction value becomes larger.

15 Claims, 6 Drawing Sheets

STEERING SYSTEM AND METHOD FOR AUTOMOTIVE VEHICLE

BACKGROUND OF THE INVENTION

1. Field of the Invention

The present invention relates to a technical field of steering system and method for an automotive vehicle in which a, so-called, steer by electric wire system in which steering (operation) inputting means and a steering mechanism are mechanically separated from each other has been adopted.

2. Description of the Related Art

A Japanese Patent Application First (Tokkai) Publication No. 2001-191937 published on Jul. 17, 2001 exemplifies a previously proposed steer by electric wire system in which a steering actuator is driven according to a current command value which accords with a steering angle of a steering wheel and a steer (or turning) angle control of steerable (or steered) (road) wheels is carried out.

SUMMARY OF THE INVENTION

However, in the previously proposed steer by electric wire system, when it becomes impossible for steerable road wheels to be steered in a steering angle increase direction, for example, in a case where the steerable road wheels are mounted on a curb during a static steering with the vehicle stopped, an excessive current command value is outputted to the steering actuator so that a motor and its drive circuit are overheated due to a following of a turning angle of the steerable wheels to the steering angle of the steering wheel.

It is, therefore, an object of the present invention to provide steering system and method for an automotive vehicle which are capable of preventing an overheat of the steering actuator.

According to one aspect of the present invention, there is provided a steering system for an automotive vehicle, comprising: a steering mechanism configured to steer steerable wheels of the vehicle; an operation inputting section that is mechanically separated from the steering mechanism; a reaction force actuator configured to provide a steering reaction force for the operation inputting section on the basis of a reaction force command value which accords with a state of the steerable wheels; a steering actuator configured to drive the steering mechanism on the basis of a turning angle command value which accords with a steering angle of the operation inputting section; a turning angle correction value setting section that sets a turning angle correction value on the basis of the reaction force command value; and a turning angle command value correcting section that subtracts the turning angle correction value from the turning angle command value, the turning angle correction value setting section setting the turning angle correction value in such a manner that, as the reaction force command value becomes larger, the turning angle correction value becomes larger.

According to another aspect of the present invention, there is provided a steering method for an automotive vehicle, comprising: providing a steering mechanism configured to steer steerable wheels of the vehicle; providing an operation inputting section that is mechanically separated from the steering mechanism; providing a reaction force actuator configured to provide a steering reaction force for the operation inputting section on the basis of a reaction force command value which accords with a state of the steerable wheels; providing a steering actuator configured to drive the steering mechanism on the basis of a turning angle command value which accords with a steering angle of the operation inputting section; setting a turning angle correction value on the basis of the reaction force command value; and subtracting the turning angle correction value from the turning angle command value, the turning angle correction value being set in such a manner that, as the reaction force command value becomes larger, the turning angle correction value becomes larger.

This summary of the invention does not necessarily describe all necessary features so that the invention may also be a sub-combination of these described features.

DETAILED DESCRIPTION OF THE PREFERRED EMBODIMENTS

Reference will hereinafter be made to the drawings in order to facilitate a better understanding of the present invention.

Figure 1:
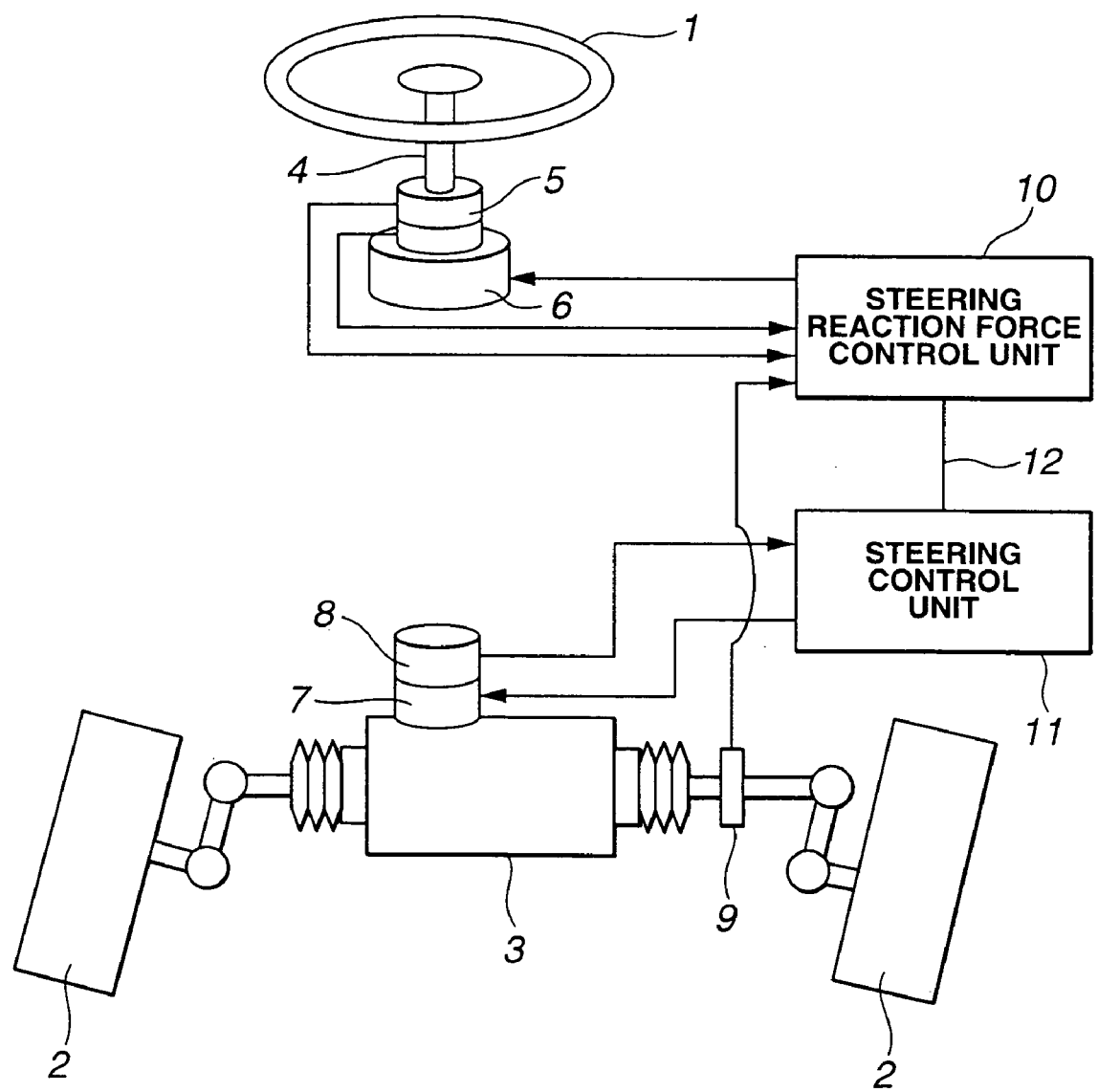
FIG. 1 is a whole structural view of a steer by electric wire system to which a first preferred embodiment of a steering system for an automotive vehicle according to the present invention is applicable.

FIG. 1 shows a whole system configuration of a, so-called, steer by electrical wire system to which a vehicular steering system in a first preferred embodiment according to the present invention is applicable. The steering system in the first embodiment includes: a steering wheel (operation inputting section (means)) 1; steered (steerable) vehicle wheels 2, 2; a steering mechanism 3; a column shaft 4; a steering wheel angle sensor 5; a reaction force actuator 6; a steering (or turning) actuator 7; a steer angle (or turning angle) sensor 8; a force sensor 9; a steering reaction force control unit 10; and a steering (or turning) control unit 11.

Steering wheel angle sensor 5 which detects a steering angle of steering wheel (operation inputting section (means) 1 which is the steering angle of the driver inputted through steering wheel 1 (also called, a steering wheel angle) and reaction force actuator 6 which gives a steering reaction force to steering wheel 1 are disposed on column shaft 4 linked to steering wheel 1. Reaction force actuator 6 is, for example, constituted by a DC brushless motor, an output shaft of the motor being linked to column shaft 4 via a speed reducer.

Steering (or turning) actuator 7 which drives steering mechanism 3 and turning angle sensor 8 which detects a working angle (motor revolution angle) of steering actuator 7 are disposed on steering mechanism 3. Force sensor 9 is installed on a rack shaft of steering mechanism 3 to detect a road reaction force (rack axial force). Steering actuator 7 is constituted by the DC brushless motor in the same way as reaction force actuator 6, the output shaft of this motor being linked to the rack shaft via the speed reducer.

Steering reaction force control unit 10 calculates a reaction force command value on the basis of the steering wheel angle from steering wheel angle sensor 5 and a road reaction force from force sensor 9. Steering reaction force control unit 10 outputs the current command value which accords with the calculated reaction force command value to reaction force actuator 6.

Steering control unit 11 calculates a turning (steer) angle command value for steering (or turning) actuator 7 on the basis of the steering wheel angle of steering wheel angle sensor 5. Steering control unit 11 refers to the motor revolution angle from turning angle sensor 8 and outputs a current command value so that an actual turning angle of steerable (road) wheels 2, 2 is made coincident with the turning angle command value to steering (or turning) actuator 7. It is noted that a data transfer between steering reaction force control unit 10 and steering (or turning) control unit 11 is carried out via a bidirectionally communicable communication line 12.

Figure 2:
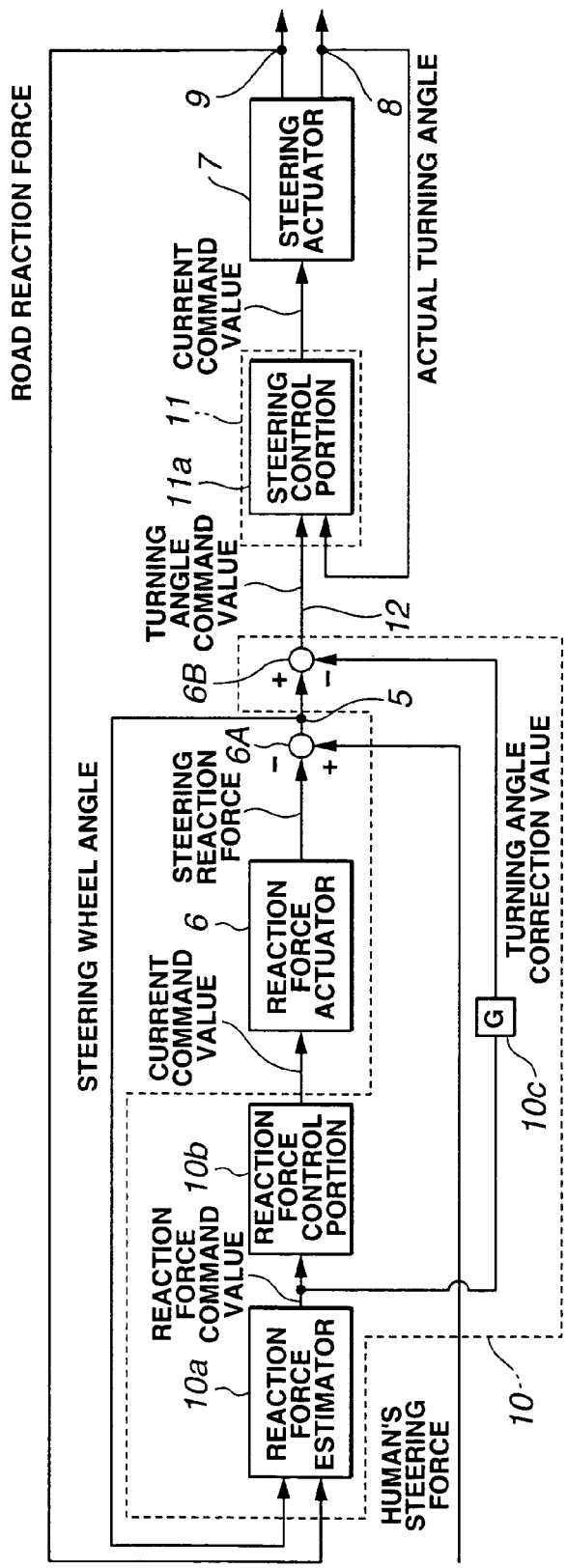
FIG. 2 is a control block diagram of a steering reaction force control unit and a steering control unit shown in FIG. 1.

FIG. 2 shows a control block diagram of steering reaction force control unit 10 and steering control unit 11. Steering reaction force control unit 10 includes: a reaction force estimator 10a; a reaction force control portion 10b; and a turning angle correction value setting portion (section) 10c.

Reaction force estimator 10a receives the steering wheel angle detected by means of steering angle sensor 5 in accordance with the steering operation by the operator (driver) and the road reaction force measured by force sensor 9 in accordance with a situation of a road surface. Reaction force estimator 10a calculates a reaction force command value from the steering wheel angle and road reaction force and outputs the reaction force command value to reaction force control portion 10b and turning angle correction value setting portion 10c.

Reaction force control portion 10b calculates a current command value of reaction force actuator 6 on the basis of the inputted reaction force command value. Reaction force actuator 6 generates the steering reaction force at steering wheel 1 in accordance with the current command value. The steering wheel angle becomes a value determined according to a force balance between the steering reaction force and a force applied to steering wheel 1 by a human (person), i.e., a vehicle driver.

Turning angle correction value setting portion 10c calculates a turning (or steer) angle correction value by multiplying a correction gain G (constant) by the reaction force command value (turning angle correction value setting portion 10c corresponds to turning angle correction value setting means (section)). A value of subtraction of the turning angle correction value from a value of the steering wheel angle multiplied by a steering gear ratio is inputted to steering control unit 11 via communication line 12 as a turning angle command value (this corresponds to turning angle command value correcting section (means)). It is noted that the steering gear ratio is set so as to be varied in accordance with a vehicle speed or another vehicle running (traveling) state representing parameter.

Steering control unit 11 includes a steering control portion 11a. Steering control portion 11a outputs a current command value to steering actuator 7 so that an actual turning angle of steerable road wheels 2, 2 becomes equal to the value of the turning angle command value while referring to the motor revolution angle from turning angle sensor 8. Steering actuator 7 drives steering mechanism 3 to obtain the steer (or turning) angle of steerable road wheels 2, 2 in accordance with the inputted current command value. In FIG. 2, a reference numeral 6A denotes a first subtractor and a reference numeral 6B denotes a second subtractor. It is noted that a plus side of second subtractor 6B receives the steering angle of steering wheel 1 multiplied by the steering gear ratio.

Next, an action of the steering system in the first embodiment will be described below.

[Turning Angle Command Value Correction Control Process]

Figure 3:
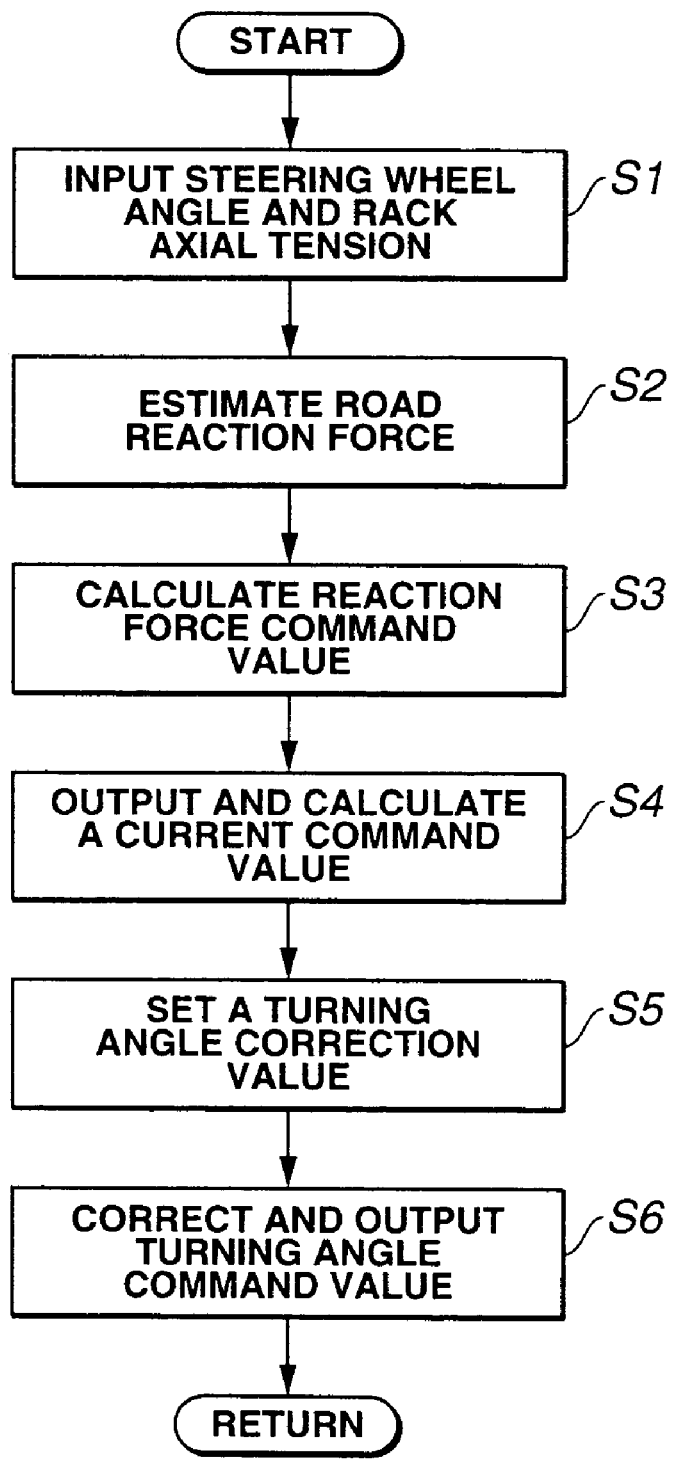
FIG. 3 is a flowchart representing a flow of a turning angle command value correction control executed by steering reaction force control unit 10 shown in FIG. 1.

FIG. 3 shows a flowchart representing a flow of the turning angle command value correction control process executed by steering reaction force control unit 10 in the first embodiment. Each step will be described below. It is noted that the control procedure shown in FIG. 3 is executed for each of predetermined control periods (for example, 10 milliseconds).

At a step S1, reaction force estimator 10a inputs steering wheel angle θ and a rack axial force (or rack axial tension) and the routine goes to a step S2.

At step S2, reaction force estimator 10a estimates the road reaction force from the inputted rack axial force and the routine goes to a step S3.

At step S3, reaction force estimator 10a calculates the reaction force command value of reaction force actuator 6 from the road reaction force estimated at step S2 and the steering wheel angle inputted at step S1 and the routine goes to a step S4.

At step S4, reaction force control portion (or section) 10b calculates the current command value from the reaction force command value calculated at step S3 and outputs the calculated current command value to reaction force actuator 6 and the routine goes to a step S5.

At step S5, steering angle correction value setting portion (or section) 10c multiplies the reaction force command value calculated at step S3 with correction gain G to set the steering angle correction value and the routine goes to a step S6.

At step S6, second subtractor 6B subtracts the turning angle correction value set at step S5 from the value of the steering wheel angle multiplied by the steering gear ratio and outputs a subtraction result to steering wheel control portion 11a of steering control unit 11 as the turning angle command value and the routine returns to the start position.

PROBLEM TO BE SOLVED

In the previously proposed steer by electrical wire system in which steering wheel 1 and steering mechanism 3 are mechanically separated from each other and the steering of the steerable road wheels is carried out using the steering actuator such as an electric motor, a steer (turning) angle control is carried out with the steering wheel angle as a command value. In this steer by wire system, the steering (turning) angle control is carried out so that the steering wheel angle is made coincident with the steer (turning) angle of the steerable road wheels. Hence, the steerable road wheels are responded to a minute steering through the steering wheel. Especially, during a high-speed run of the vehicle, the vehicle is oversensitively responded to the steering operation through the steering wheel. Thus, a vehicle in which the previously proposed steer by electrical wire system described above is mounted is difficult to drive. It is noted that, in an ordinarily available steering system in which the steering wheel and the steering mechanism are linked with a steering shaft, the minute steering operation through the steering wheel is absorbed by means of a twist (or torsion) of the steering shaft. Hence, the above-described problem is not developed in the ordinarily available steering system.

On the other hand, in the steer by electrical wire system, as means for developing a deviation between the steering wheel angle and the steering (or turning) angle (the twist), means for reducing an anti-disturbance characteristic of the steering (turning) angle control may be considered. However, in this case, a performance for compensating an external disturbance other than a running environment (non-linearity characteristics of the motor and the actuator, deviations in characteristics thereof) is also reduced.

In addition, the Japanese Patent Application First Publication No. 2001-191937 has proposed a technique in which, in order to improve the oversensitive response of the steering during the high speed run, a vehicular yaw rate is measured, a target yaw rate is derived from the steering wheel angle, and the steer (turning) angle control of the steerable road wheels is carried out to make the target yaw rate coincident with an actual yaw rate.

However, in the previously proposed technique described in the above-described Japanese Patent Application First Publication, when, during the low speed run at which the yaw rate cannot be measured, the steerable road wheels are mounted on the curb due to the static steering, the excessive current command value is outputted to the steering actuator, trying to make the steering (turning) angle of the steerable road wheels coincident with the steering wheel angle so that the overheat of the motor and its drive circuit occurs.

[Steering (Turning) Angle Command Value Correcting Action in Accordance with Reaction Force Command Value]

Whereas, in the steering system of the first embodiment, with the value of the reaction force command value of steering reaction force actuator 6 multiplied by correction gain G as the turning angle correction value, this turning angle correction value is subtracted from the value of the steering wheel angle multiplied by the steering gear ratio to correct the turning angle command value for steering actuator 7.

Thus, in a case where steerable wheels 2, 2 are mounted on the curb during the steering operation (the static-steering) with the vehicle stopped, a large reaction force command value is outputted. Accordingly, the turning angle correction value also becomes large. Thus, the turning angle command value is a smaller value than the value which accords with the actual steering wheel angle.

Ordinarily, in the steering (turning) angle control, the actual steering (turning) angle is fedback and the current command value becomes large in proportion to a difference between the actual turning (steer) angle and the turning (steer) angle command value. Hence, in the previously proposed steer by electrical wire system, in a case where the steerable road wheels mounted on the curb cannot be steered any more in the steering angle increase direction (toward the maximum steering increase direction), the difference between the actual turning angle and the turning angle command value becomes large. Hence, the large current command value is outputted and the problem of the overheat in the motor and its drive circuit is raised.

However, in the first embodiment, the steer (turning) angle command value itself is corrected. Hence, the difference between the actual steer (turning) angle and the turning angle command value does not become large. Thus, the current command value can be avoided from being enlarged to a degree such that the motor and its drive circuit are overheated.

[Vehicular Behavior (Motion) Stabilization Action During a High Speed Run Due to the Turning Angle Correction]

In addition, in a case where, during the high speed run of the vehicle, the road reaction force (a self-aligning torque) is large and the reaction force command value is large, the turning angle correction value is accordingly large. In addition, the turning angle correction value is subtracted from the steering wheel angle even if steering wheel 1 is operated. Hence, the turning angle command value becomes smaller value than the actual steering wheel angle. Thus, when steering wheel 1 is operated during the high speed run of the vehicle, the oversensitive response of the steering (turning) angle of steerable road wheels 2, 2 can be reduced and a stable vehicular run can be achieved.

[Steering Response Characteristic Improving Action During the Low Speed Vehicular Run Through the Turning Angle Correction]

On the contrary, in a case where the vehicle speed is low and the self-aligning torque is small, the turning angle correction value is also small and the approximately same angle as the steering wheel angle provides the steering (turning) angle command value. Hence, when the vehicle turns left or right in a traffic intersection, the vehicle has a sufficient quick responsive characteristic to the steering operation through steering wheel 1 and it is not necessary to steer steering wheel 1 more than necessary. In other words, the turning angle command value is varied reflecting the situation of the road surface. Hence, in an inexpensive steering system having no yaw rate sensor, a behavior of the twist equivalent to the steering shaft in the ordinarily available steering system can be reproduced.

[Difference from Electrical Power Assistance Steering System]

In a Japanese Patent Application First (Tokkai) Publication No. 2000-72006 published on Mar. 7, 2000, a technique such that an overheat of the motor is estimated, in the electrical power assisted steering system, and a limitation value of the current command value is varied. However, this technique limits a reduction in a steering burden which the electrical power assisted steering system naturally functions due to a protection of the already overheated motor.

On the other hand, in the steer by electrical wire system, the limitation on the current command value for the steering (turning) actuator is not preferable from the viewpoint of a safety. For example, in a case where the motor is overheated during the run on mountain roads and the current command value is limited, there is a possibility that a sufficient steering cannot be carried out.

Therefore, in the steer by electric wire system, it is necessary to perform a processing that a wasteful current does not flow as least as possible without the overheat of the motor. If the motor should be overheated, the current command value is not limited but such a processing that the vehicle speed is forcefully reduced should be carried out.

Next, advantages of the steering system in the first embodiment will be described below.

(1) Since, in the vehicular steering system in the first embodiment in which steering mechanism 3 to turn (steer) vehicular steerable road wheels 2, 2, steering wheel 1 mechanically separated from steering mechanism 3, reaction force actuator 6 which gives steering wheel 1 the steering reaction force, and steering actuator 7 which drives steering mechanism 3 on the basis of the turning angle command value which accords with the steering wheel angle, turning angle correction value setting portion (section) 10c configured to set the turning angle correction value on the basis of the reaction force command value and the turning angle command value correcting section configured to subtract the turning angle correction value from the turning angle command value are provided. Then, turning angle correction value setting portion 10c makes the turning angle correction value larger as the reaction force command value becomes larger.

Therefore, in a case where it becomes impossible for steerable road wheels 2, 2 to be steered toward the (maximum) steering angle increase direction due to the presence of the curb, the excessively large turning angle command value can be avoided from occurring and the overheat of steering actuator 7 can be prevented from occurring.

(2) Since turning angle correction value setting portion (section) 10c multiplies correction gain G (constant) by the reaction force command value to set the turning angle correction value, the turning angle command value can be corrected with the situation of the road surface (self-aligning torque) reflected. The behavior of the twist equivalent to that found in the steering shaft of the ordinarily available vehicular steering system can be reproduced.

Next, a second preferred embodiment of the vehicular steering system will be described below. In the second embodiment, the value of correction gain G is varied in accordance with a running situation of the vehicle.

Figure 4:
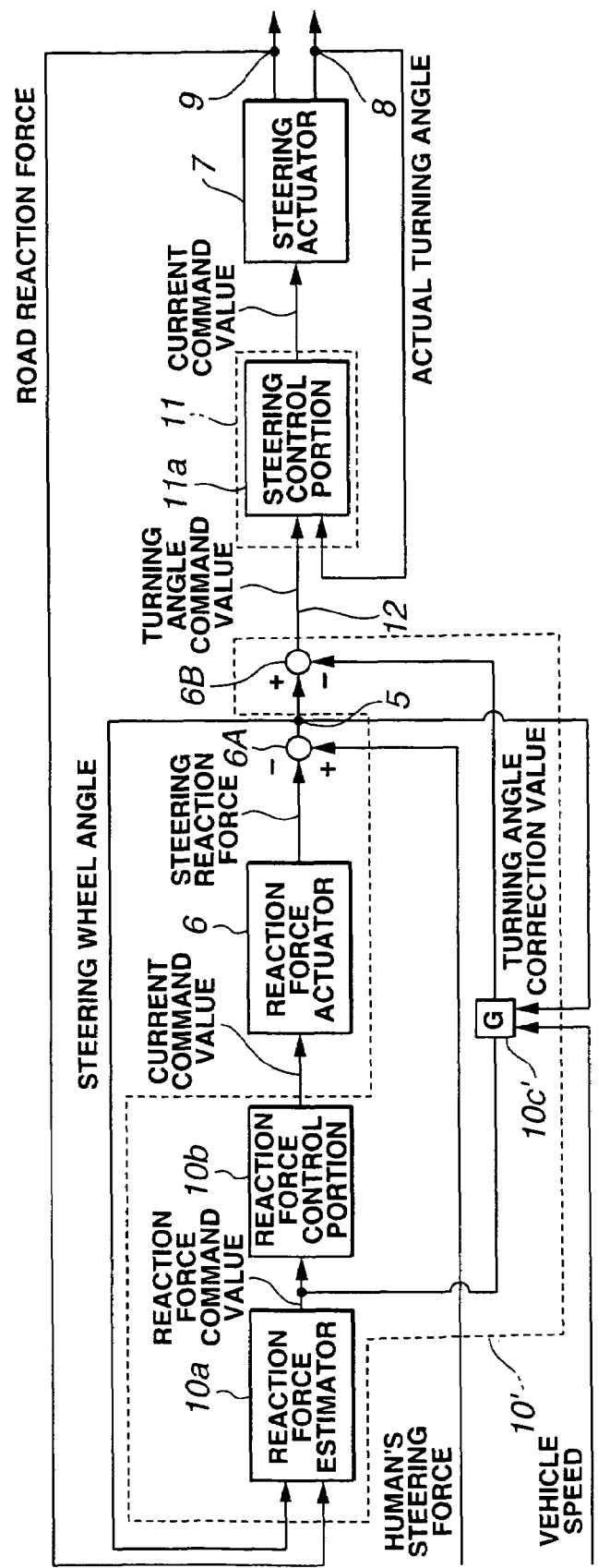
FIG. 4 is a control block diagram of steering reaction force control unit and steering control unit in a second preferred embodiment of the steering system for the automotive vehicle according to the present invention.

FIG. 4 shows a control block diagram representing steering reaction force control unit 10' and steering control unit 11 in the second embodiment. Steering reaction force control unit 10' in the second embodiment is different from the first embodiment in that, in turning angle correction value setting section 10c', correction gain G is set on the basis of a vehicle speed V and steering wheel angle θ. The other structure of the steering system is the same as described in the first embodiment. Thus, the same reference numerals as those described in the first embodiment designate like components and the detailed description thereof will herein be omitted.

Figure 5:
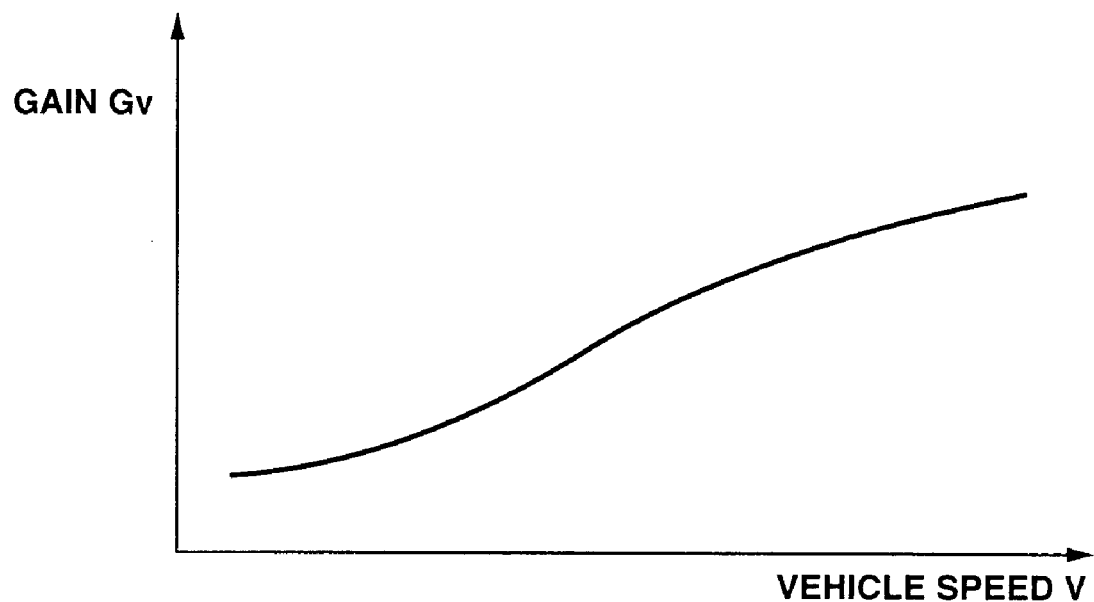
FIG. 5 is a setting map representing a relationship between a vehicle speed V and a gain Gv.
Figure 6:
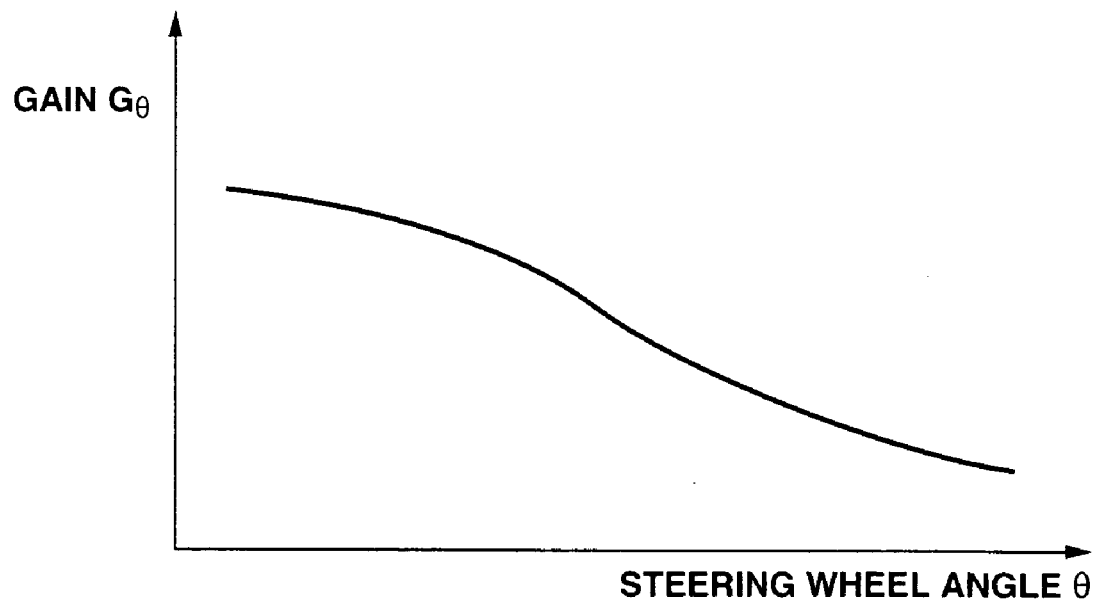
FIG. 6 is a setting map representing a relationship between a steering wheel angle $\theta$ and a gain $G_\theta$.

Steering angle correction value setting section 10c' compares first gain Gv obtained from a map shown in FIG. 5 with second gain $G_\theta$ obtained by referring to a map shown in FIG. 6 and sets a larger one of the compared gains to be the correction gain G, correction gain G being multiplied by the reaction force command value to set the turning angle correction value. It is noted that, if Gv=$G_\theta$, first gain Gv is set to correction gain G.

FIG. 5 shows a setting map representing gain Gv varied in accordance with vehicle speed V. This map shown in FIG. 5 is set in such a way that, as the vehicle speed V becomes higher, gain Gv becomes larger. Thus, as vehicle speed V is increased, turning angle correction value becomes large. The turning angle command value becomes smaller than a value of the turning angle command value which is in accordance with actual steering wheel angle θ.

FIG. 6 shows a setting map representing gain $G_\theta$ varied in accordance with steering wheel angle θ. This setting map is set in such a way, as steering wheel angle θ becomes larger (wider), gain $G_\theta$ becomes smaller. Hence, as steering wheel angle θ becomes smaller, the turning angle correction value becomes larger. The turning angle command value becomes smaller than a value of the turning angle command value which is in accordance with actual steering wheel angle θ.

Next, an action of the second embodiment will be described below.

[Turning Angle Command Value Correction Control Process]

Figure 7:
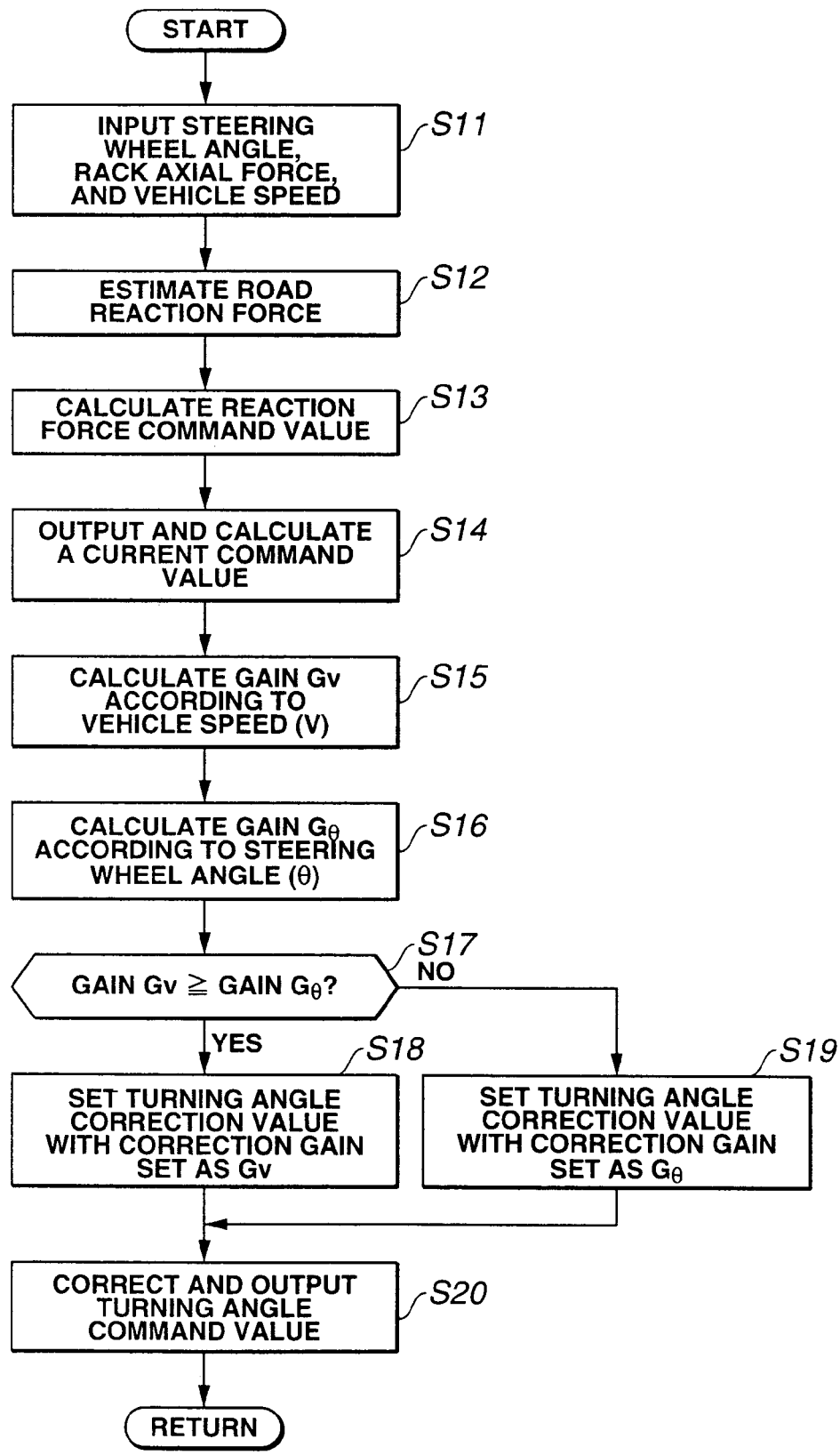
FIG. 7 is a flowchart representing a flow of a corrective control process of a steer (or turning) angle command value executed by steering reaction force control unit in the second embodiment shown in FIG. 4.

FIG. 7 shows a flowchart representing a flow of the turning angle command value correction control process executed in steering reaction force control unit 10' in the second preferred embodiment according to the present invention. It is noted that, since steps S12 through S14 of FIG. 7 perform the same processes as steps S2 through S4 in FIG. 3 and step S20 in FIG. 7 performs the same process as step S6 in FIG. 3, the detailed description thereof will be omitted and only different steps will be described.

At step S11, reaction force estimator 10a inputs steering wheel angle θ and rack axial force and turning angle correction value setting section 10c' inputs vehicle speed V and steering wheel angle θ. Then, the routine goes to a step S12.

At step S15, turning angle correction value setting section 10c' refers to the map shown in FIG. 5 from vehicle speed V inputted at step S11 to calculate a gain (first gain) Gv in accordance with vehicle speed V. Then, the routine goes to step S16.

At step S16, turning angle correction value setting section 10c' refers to the map shown in FIG. 6 from steering wheel angle θ inputted at step S11 to calculate a gain (second gain) $G_\theta$ in accordance with steering wheel angle θ. Then, the routine goes to step S17. At step S17, turning angle correction value setting section 10c' determines whether gain Gv calculated at step S15 is equal to or larger than gain $G_\theta$ calculated at step S16. If Yes, the routine goes to a step S18. If No at step S17, the routine goes to a step S19.

At step S18, turning angle correction value setting section (or portion) 10c' sets gain Gv calculated at step S15 as correction gain G and multiplies reaction force command value calculated at step S13 by correction gain G. Then, the routine goes to a step S20. On the other hand, at step S19, turning angle correction value setting section 10c' sets gain $G_\theta$ calculated at step S16 as correction gain G and multiplies the reaction force command value by correction gain G to set the turning angle correction value. Then, the routine goes to step S20.

In the flowchart shown in FIG. 7, at step S17, first gain Gv which varies in accordance with vehicle speed V and second gain $G_\theta$ which varies in accordance with steering wheel angle θ are compared with each other and, with either larger one set as correction gain G, the turning angle command value is corrected. It is noted that in a case where Gv=$G_\theta$, Gv is selected as correction gain G.

[Vehicular Behavior (Motion or Dynamics) Stability Action During a High Speed Traveling]

During the high speed traveling, it is demanded that a steering response is suppressed with a vehicular stability taken into consideration. In the second embodiment, since the turning angle correction value is made larger as vehicle speed V becomes higher, the turning angle command value to steering wheel angle θ is suppressed to be small. Consequently, a vehicle response can be suppressed. In addition, in general, since steering wheel angle θ during the high speed traveling is small, the turning angle command value can be suppressed to be small due to the large turning angle correction value.

[Steering Responsive Characteristic Improvement Action During a Low Speed Traveling]

Under a situation in which the vehicle travels at a low speed such as a right turn or left turn in a traffic intersection or entrance of a parking lot, steering wheel angle θ becomes large. Under such a situation as described above, there is least possibility that the vehicular behavior becomes unstable with respect to the operation of steering wheel 1 and it is preferable for steerable wheels 2, 2 to be steered in accordance with steering wheel angle θ.

In the second embodiment, the turning angle correction value is made smaller as steering wheel angle θ becomes larger and the steering angle correction value is made smaller as vehicle speed V becomes lower. Hence, during the right turn or left turn of the traffic intersection and entrance of the parking lot, the turning angle of steerable wheels 2, 2 approaches to steering wheel angle θ so that a high steering responsive characteristic can be assured.

Next, advantages of the steering system according to the present invention will be described below. In the vehicular steering system in the second embodiment, the following advantages can be obtained in addition to the advantages (1) and (2) of the first embodiment.

(3) Since turning angle correction value setting section 10c' varies the turning angle correction value in accordance with the traveling state of the vehicle, an optimum steering response characteristic in accordance with the traveling state can be set.

(4) Since turning angle correction value setting section 10c' makes correction gain Gv larger as vehicle speed V becomes higher, the stability improvement of the vehicle behavior during the high speed travel and the steering responsive characteristic improvement during the low speed travel become highly compatible.

(5) Since turning angle correction value setting section 10c' makes the value of correction gain $G_\theta$ smaller as steering wheel angle θ becomes larger, the stability improvement of the vehicular behavior during the high speed travel and the steering responsive characteristic during the low speed travel become highly compatible.

Other Embodiments

As described hereinabove, best preferred embodiments to carry out the present invention are based on the first and second preferred embodiments. Specific structure of the present invention is not limited to these embodiments. Various changes and modifications may be made without departing from the scope and sprit of the present invention.

For example, in each of the first and second embodiments, both of turning angle correction value setting means (turning angle correction value setting section 10c, 10c') and turning angle command value correcting means (steering angle command value correcting section 6B) are installed at steering reaction force control unit 10. However, the present invention is not limited to this. These sections may be installed in steering control unit 11. In addition, these sections may be independently installed from these control units 10, 11.

In each of the first and second embodiments, the example in which the road (surface) reaction force acted upon the steering system is calculated from the rack axial force measured by means of force sensor 9 is shown. Road reaction force may be estimated on the basis of a motor voltage value and a motor current value of steering actuator 7.

In the second embodiment, correction gain G is varied in accordance with vehicle speed V and steering wheel angle θ. Correction gain G may be set in accordance with other vehicle traveling states such as a vehicular acceleration, steering angular velocity of steering wheel 1, a lateral acceleration, and/or a vehicle body slip angle.

The entire contents of a Japanese Patent Application No. 2004-250983 (filed in Japan on Aug. 30, 2004) are herein incorporated by reference. The scope of the invention is defined with reference to the following claims.

What is claimed is:

1. A steering system for an automotive vehicle, comprising:
    a steering mechanism configured to steer steerable wheels of the vehicle;
    an operation inputting section that is mechanically separated from the steering mechanism;
    a reaction force actuator configured to provide a steering reaction force for the operation inputting section on the basis of a reaction force command value based on conditions of a road surface on which the vehicle runs;
    a steering actuator configured to drive the steering mechanism on the basis of a turning angle command value which accords with a steering angle of the operation inputting section;
    a turning angle correction value setting section that sets a turning angle correction value on the basis of the reaction force command value; and
    a turning angle command value correcting section that subtracts the turning angle correction value from the turning angle command value, wherein the turning angle correction value setting section is configured to set the turning angle correction value in such a manner that, as the reaction force command value becomes larger, the turning angle correction value becomes larger.

2. The steering system as claimed in claim 1, wherein the turning angle correction value setting section sets the reaction force command value multiplied by a correction gain to be the turning angle correction value.

3. The steering system as claimed in claim 2, wherein the turning angle correction value setting section varies the correction gain in accordance with a vehicular traveling state.

4. The steering system as claimed in claim 3, wherein the turning angle correction value setting section makes a value of the correction gain larger as a vehicle speed becomes higher.

5. The steering system as claimed in claim 3, wherein the turning angle correction value setting section makes a value of the correction gain smaller as the steering angle of the operation inputting section becomes larger.

6. A steering system for an automotive vehicle as claimed in claim 1, wherein the operation inputting section comprises a steering wheel and the steering system further comprises:
    a force sensor configured to measure a road reaction force;
    a reaction force estimator configured to calculate the reaction force command value from the steering angle of the steering wheel and the road reaction force measured by the force sensor; and
    a reaction force controller configured to calculate a first current command value for the reaction force actuator on the basis of the calculated reaction force command value, the reaction force actuator providing the steering reaction force for the steering wheel in accordance with the first current command value.

7. The steering system as claimed in claim 6, wherein the turning angle command value correcting section multiplies the reaction force command value by a correction gain to set the turning angle correction value.

8. The steering system as claimed in claim 7, wherein the steering system further comprises a first subtractor to subtract a human's steering force acted on the steering wheel from the steering reaction force to output the steering angle of the steering wheel.

9. The steering system as claimed in claim 8, wherein the turning angle command value correcting section subtracts the turning angle correction value from an output value of the first subtractor multiplied by a steering gear ratio to provide the turning angle command value.

10. The steering system as claimed in claim 9, wherein the steering system further comprises:
    a turning angle sensor configured to detect a motor revolution angle of the steering actuator to derive an actual turning angle of the steerable wheels; and
    a steering control section configured to output a second current command value to the steering actuator in accordance with the turning angle command value, the second current command value being outputted to the steering actuator in such a manner that the actual turning angle of the steerable wheels is made coincident with the turning angle command value.

11. The steering system as claimed in claim 7, wherein the turning angle correction value setting section sets the correction gain on the basis of a vehicle speed and the steering angle of the steering wheel.

12. The steering system as claimed in claim 11, wherein the turning angle correction value setting section compares a first gain derived according to the vehicle speed and a second gain derived according to the steering angle of the steering wheel to determine whether the first gain is equal to or larger than the second gain, sets the first gain to the correction gain when determining that the first gain is equal to or larger than the second gain, and sets the second gain to the correction gain when determining that the second gain is larger than the first gain.

13. A steering method for an automotive vehicle, comprising:
   providing a steering mechanism configured to steer steerable wheels of the vehicle;
   providing an operation inputting section that is mechanically separated from the steering mechanism;
   providing a reaction force actuator configured to provide a steering reaction force for the operation inputting section on the basis of a reaction force command value based on conditions of a road surface on which the vehicle runs;
   providing a steering actuator configured to drive the steering mechanism on the basis of a turning angle command value which accords with a steering angle of the operation inputting section;
   setting a turning angle correction value on the basis of the reaction force command value; and
   subtracting the turning angle correction value from the turning angle command value, the turning angle correction value being set in such a manner that, as the reaction force command value becomes larger, the turning angle correction value becomes larger.

14. A steering system for an automotive vehicle, comprising:
   a steering mechanism configured to steer steerable wheels of the vehicle;
   operation inputting means that is mechanically separated from the steering mechanism;
   reaction force actuating means for providing a steering reaction force for the operation inputting means on the basis of a reaction force command value based on conditions of a road surface on which the vehicle runs;
   steering actuating means for driving the steering mechanism on the basis of a turning angle command value which accords with a steering angle of the operation inputting means;
   turning angle correction value setting means for setting a turning angle correction value on the basis of the reaction force command value; and
   turning angle command value correcting means for subtracting the turning angle correction value from the turning angle command value, the turning angle correction value setting means setting the turning angle correction value in such a manner that, as the reaction force command value becomes larger, the turning angle correction value becomes larger.

15. A steering system for an automotive vehicle, comprising:
   a steering mechanism configured to steer steerable wheels of the vehicle;
   an operation inputting section that is mechanically separated from the steering mechanism;
   a reaction force actuator configured to provide a steering reaction force for the operation inputting section on the basis of a reaction force command value based on conditions of a road surface on which the vehicle runs;
   a steering actuator configured to drive the steering mechanism on the basis of a turning angle command value which accords with a steering angle of the operation inputting section;
   a turning angle correction value setting section that sets a turning angle correction value on the basis of the reaction force command value; and
   a turning angle command value correcting section configured to provide a turning angle command value, wherein the turning angle command value correcting section is configured such that the turning angle command value decreases as the reaction force command value becomes larger.

* * * * *